(12) United States Patent
Kataoka et al.

(10) Patent No.: US 10,922,343 B2
(45) Date of Patent: Feb. 16, 2021

(54) DATA SEARCH DEVICE, DATA SEARCH METHOD, AND RECORDING MEDIUM

(71) Applicant: FUJITSU LIMITED, Kawasaki (JP)

(72) Inventors: Masahiro Kataoka, Kamakura (JP); Ryo Matsumura, Numazu (JP); Junki Hakamata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 550 days.

(21) Appl. No.: 15/680,247

(22) Filed: Aug. 18, 2017

(65) Prior Publication Data
US 2018/0113932 A1    Apr. 26, 2018

(30) Foreign Application Priority Data

Oct. 21, 2016  (JP) ................................ 2016-207216

(51) Int. Cl.
  *G06F 16/33*  (2019.01)
  *G06F 16/31*  (2019.01)

(52) U.S. Cl.
  CPC ............ *G06F 16/334* (2019.01); *G06F 16/31* (2019.01); *G06F 16/316* (2019.01)

(58) Field of Classification Search
  CPC .. G06F 16/90344; G06F 16/22; G06F 16/245; G06F 16/24558; G06F 16/3341; G06F 16/2365; G06F 21/6209; G06F 11/108; G06F 11/2094; G06F 16/2455; G06F 16/13; G06F 16/2237; G06F 16/24542
  USPC .......... 707/600–831, 899, 999.001–999.206
  See application file for complete search history.

(56) References Cited

U.S. PATENT DOCUMENTS

| 5,329,598 | A | * | 7/1994 | Geist ........................ G06K 9/03 382/186 |
| 5,745,745 | A | * | 4/1998 | Tada ........................ G06F 16/81 |
| 5,748,953 | A | * | 5/1998 | Mizutani .................. G06K 9/62 |
| 7,698,325 | B1 | * | 4/2010 | Ozekinci ............. G06F 16/2228 707/698 |
| 8,160,402 | B2 | | 4/2012 | Wu et al. |

(Continued)

FOREIGN PATENT DOCUMENTS

| JP | 8-69476 A | 3/1996 |
| JP | 09-036747 A | 2/1997 |

(Continued)

OTHER PUBLICATIONS

Office Action dated Jun. 13, 2018 in European Patent Application No. 17188113.9, 7 pages.

(Continued)

*Primary Examiner* — Angelica Ruiz
(74) *Attorney, Agent, or Firm* — Xsensus LLP

(57) ABSTRACT

A non-transitory computer-readable recording medium stores a data search program that causes a computer to execute a process including: receiving a search character string for target text data; and searching for the search character string by a logical operation between index information associated with appearance positions in the target text data of each of characters or words appearing in the target text data as bitmap data and search bitmap data generated to be associated with an appearance order in the search character string of respective characters or respective words constituting the search character string.

5 Claims, 10 Drawing Sheets

(56) References Cited

U.S. PATENT DOCUMENTS

| | | |
|---|---|---|
| 9,793,920 B1 | 10/2017 | Kataoka et al. |
| 2003/0120642 A1* | 6/2003 | Egilsson ................ G06F 16/30 |
| 2005/0086234 A1 | 4/2005 | Tosey |
| 2009/0028445 A1 | 1/2009 | Wu et al. |
| 2009/0028446 A1 | 1/2009 | Wu et al. |
| 2009/0028777 A1 | 1/2009 | Zhamu et al. |
| 2010/0257159 A1 | 10/2010 | Uematsu et al. |
| 2013/0031133 A1* | 1/2013 | Adzic ................ G06F 16/2228 |
| | | 707/778 |
| 2014/0222852 A1 | 8/2014 | Yitshak |
| 2016/0217207 A1 | 7/2016 | Okura et al. |
| 2016/0364707 A1* | 12/2016 | Varma ...................... G06F 8/61 |
| 2017/0103123 A1 | 4/2017 | Kataoka et al. |
| 2017/0300491 A1 | 10/2017 | Kataoka et al. |
| 2017/0300507 A1 | 10/2017 | Kataoka et al. |
| 2018/0101553 A1 | 4/2018 | Nakamura et al. |
| 2018/0113932 A1 | 4/2018 | Kataoka et al. |
| 2018/0276260 A1 | 9/2018 | Kataoka et al. |
| 2018/0285443 A1 | 10/2018 | Kataoka et al. |

FOREIGN PATENT DOCUMENTS

| | | |
|---|---|---|
| JP | 10-283368 | 10/1998 |
| JP | 11-85459 | 3/1999 |
| JP | 2009-48352 A | 3/2009 |
| WO | 2009/066501 A1 | 5/2009 |

OTHER PUBLICATIONS

Extended European Search Report dated Nov. 16, 2017 in Patent Application No. 17188113.9.

Office Action dated Feb. 12, 2019 in corresponding European Patent Application No. 17188113.9, 7 pages.

Fukushima, S., "Algorithm of File Compression Tool gzip", bit (Kyoritsu Shuppan), vol. 28, No. 3, pp. 30-37, (Mar. 1996).

Office Action issued in U.S. Appl. No. 15/926,077 dated Jan. 23, 2020.

U.S. Office Action dated Jun. 25, 2020, in co-pending U.S. Appl. No. 15/926,077.

Japanese Office Action dated Sep. 1, 2020 for corresponding Japanese patent application No. 2016-207216.

U.S. Office Action dated Nov. 25, 2020, in co-pending U.S. Appl. No. 15/926,077.

* cited by examiner

DATA SEARCH DEVICE, DATA SEARCH METHOD, AND RECORDING MEDIUM

CROSS-REFERENCE TO RELATED APPLICATION

This application is based upon and claims the benefit of priority of the prior Japanese Patent Application No. 2016-207216, filed on Oct. 21, 2016, the entire contents of which are incorporated herein by reference.

FIELD

The embodiments discussed herein are related to a data search device.

BACKGROUND

In documents including English characters, words are represented with delimiters such as a space, a comma, and a period and therefore an index used for searching is created in units of words. On the other hand, no character delimiter is represented in documents including CJK characters. Accordingly, if an index in units of words is to be created, the cost and accuracy of word extraction based on lexical analysis become an issue.

To address this issue, in addition to a case where an index is created to associate characters and character strings appearing in a search target document with n-gram characters, a technique of creating an index in which characters and the respective appearance positions are associated is also known (for example, see Japanese Laid-open Patent Publication No. 10-283368). According to this technique, an information processing device inputs a search condition and generates Japanese character positional information related to the position of each of Japanese characters included in the input search condition as an index. The information processing device also generates word position information indicating the positions of words of languages other than Japanese included in the search condition as an index. The information processing device searches for document data conforming to the search condition based on the created indexes.

[Patent Document 1] Japanese Laid-open Patent Publication No. 10-283368
[Patent Document 2] Japanese Laid-open Patent Publication No. 11-85459
[Patent Document 3] U.S. Patent Publication No. 2005/0086234 A1
[Patent Document 4] U.S. Patent Publication No. 2014/0222852 A1

SUMMARY

According to an aspect of the embodiments, a non-transitory computer-readable recording medium stores a data search program that causes a computer to execute a process including: receiving a search character string for target text data; and searching for the search character string by a logical operation between index information associated with appearance positions in the target text data of each of characters or words appearing in the target text data as bitmap data and search bitmap data generated to be associated with an appearance order in the search character string of respective characters or respective words constituting the search character string.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, the related technique has a problem that character strings indicated by a search condition are not retrieved from document data at a high speed.

For example, in the related technique, the information processing device can retrieve individual characters from information relevant to the positions associated with the characters using indexes created for the respective characters at a high speed. However, a character string (search character string) corresponding to the search condition is normally a string of consecutive characters. Therefore, in order to retrieve the search character string as well as the order of characters included therein, the information processing device needs to verify the document data afresh to find whether the positions of the respective characters constituting the search character string are consecutive. This prevents the related technique from retrieving the search character string from the document data at a high speed.

Preferred embodiments will be explained with reference to accompanying drawings. In the embodiments, devices including data search processing are described as information processing devices. The present invention is not limited by the embodiments.

Encoding Processing According to Embodiment

Figure 1:
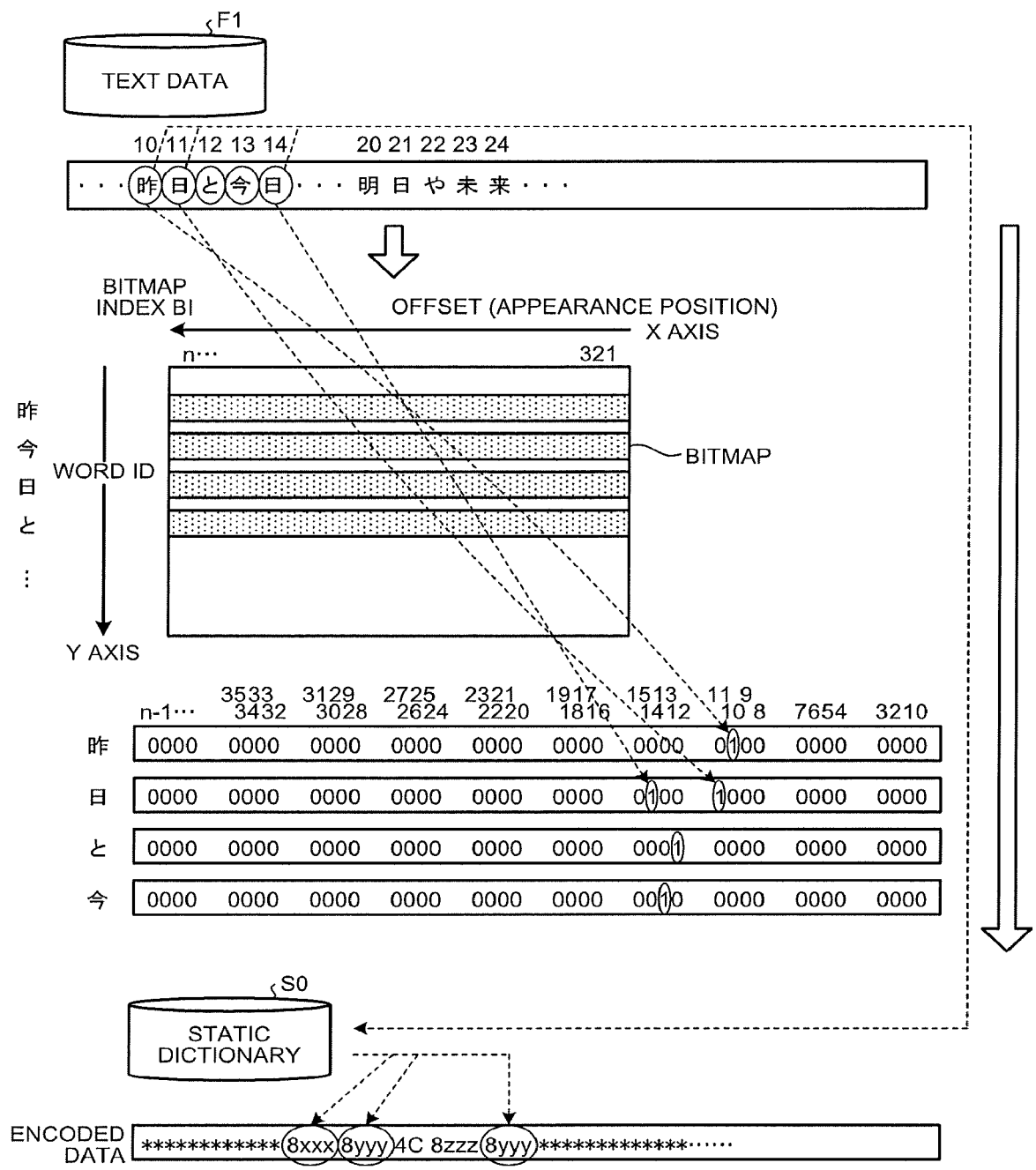
FIG. 1 is a diagram illustrating an example of a flow of encoding processing according to an embodiment.
Figure 2:
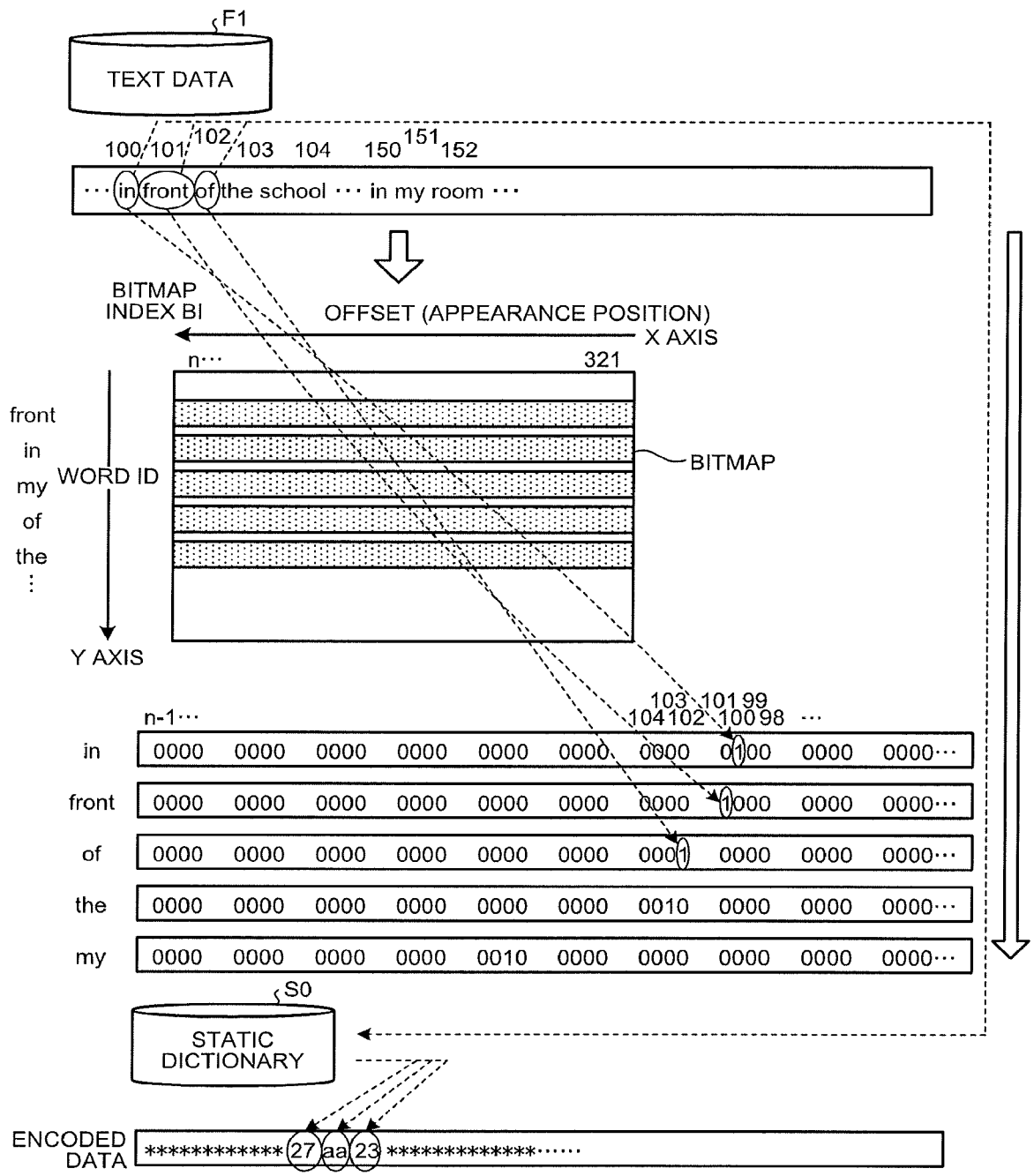
FIG. 2 is another diagram illustrating an example of the flow of encoding processing according to the embodiment.

FIGS. 1 and 2 are diagrams illustrating an example of a flow of encoding processing according to an embodiment. As illustrated in FIG. 1, in the encoding processing, when text data F1 as an encoding target is Japanese, a bitmap index BI associated with CJK characters and appearance positions of the CJK characters is created and encoded in units of CJK characters. As illustrated in FIG. 2, in the encoding processing, when text data F1 as an encoding target is English, a bitmap index BI associated with English words and appearance positions of the English words is created and encoded in units of English words. In the embodiment, CJK characters are simply referred to as "characters" and English words are simply referred to as "words".

The bitmap index BI in this example includes bit strings in each of which a pointer specifying a character or a word included in the text data F1 as the encoding target is coupled to bits indicating whether there is the character or the word at respective offsets (appearance positions) in the text data F1. That is, the bitmap index BI are bitmaps in which the presence or absence of characters or words included in the text data F1 as the encoding target at the respective offsets (appearance positions) are indexed.

As an example, when there is a character or a word at a certain appearance position in the text data F1, an appearance bit indicating ON, that is, "1" in the binary form is set as the presence or absence at an offset (appearance position) corresponding to the appearance position, as illustrated in FIGS. 1 and 2. When there is not a character or a word at a certain appearance position in the text data F1, OFF, that is, "0" in the binary form is set as the presence or absence at an offset (appearance position) corresponding to the appearance position. For example, a word ID uniquely representing a character or word is adopted as a pointer specifying a character or a word. The word ID can be a character or a word itself, or can be a code of a character or a word. A code of a character or a word means a code (encoded code) obtained by encoding thereof and corresponds to a static code, which will be described later.

As illustrated in FIGS. 1 and 2, an X axis of the bitmap index BI represents offsets (appearance positions) and a Y axis thereof represents word IDs. That is, each of the bitmaps included in the bitmap index BI indicates the presence or absence of a character or a word indicated by a word ID at each offset (appearance position).

As illustrated in FIG. 1, when the text data F1 as the encoding target is Japanese, in the encoding processing performed by an information processing device, for example, the text data F1 as the encoding target is loaded into a storage area. In the encoding processing, the text data F1 as the encoding target is read from the storage area and lexical analysis is performed on the read text data F1. The lexical analysis in this example is dividing the text data F1 in an unencoded state into units of characters.

In the encoding processing, the lexically analyzed characters are taken out sequentially from the head and an appearance bit is set in bits for appearance positions in a bitmap corresponding to each of the taken-out characters. In the encoding processing, the taken-out characters are encoded into static codes corresponding to the characters using a static dictionary S0.

The static dictionary S0 in this example is a dictionary in which an appearance frequency of each of characters or words appearing in a document is specified based on a typical English dictionary, Japanese dictionary, or textbook and a shorter code is assigned to a character or a word having a higher appearance frequency. In the static dictionary S0, static codes being codes corresponding to the respective characters or words are registered in advance.

For example, FIG. 1 illustrates " . . . 昨日と今日 (yesterday and today) . . . 明日や未来 (tomorrow and future) . . . " as the text data F1 being an encoding target. "昨" appears at the 10th position in the text data F1. "日" appears at the 11th position in the text data F1. "と" appears at the 12th position in the text data F1. "今" appears at the 13th position in the text data F1. "日" appears at the 14th position in the text data F1.

In the encoding processing, lexical analysis performed on this text data F1. In this example, "昨", "日", "と", "今", "日", "明", "日", "や", "未", "来", . . . are results of the lexical analysis.

In the encoding processing, with respect to the character "昨" appearing at the 10th position as one example, an appearance bit "1" is written in a bit for an appearance position "10" in a bitmap corresponding to the character "昨". In the encoding processing, the character "昨" is then encoded into a static code "8xxx" corresponding to the character "昨" using the static dictionary S0 and is written in encoded data.

In the encoding processing, with respect to the character "日" appearing at the 11th position as an example, an appearance bit "1" is written in a bit for an appearance position "11" in a bitmap corresponding to the character "日". In the encoding processing, the character "日" is then encoded into a static code "8yyy" corresponding to the character "日" using the static dictionary S0 and is written in the encoded data.

In the encoding processing, with respect to the character "日" appearing at the 14th position as an example, an appearance bit "1" is written in a bit for an appearance position "14" in a bitmap corresponding to the character "日". In the encoding processing, the character "日" is then encoded into the static code "8yyy" corresponding to the character "日" using the static dictionary S0 and is written in the encoded data.

Furthermore, when the text data F1 as an encoding target is English as illustrated in FIG. 2, in the encoding processing performed by the information processing device, the text data F1 being the encoding target is loaded into a storage area, for example. In the encoding processing, the text data F1 being the encoding target is then read from the storage area, and lexical analysis is performed on the read text data F1. The lexical analysis in this example is dividing the text data F1 in an unencoded state into units of words. As one example, in the encoding processing, the text data F1 is divided into words regarding terminal symbols (a space, for example) as delimiters.

In the encoding processing, the lexically analyzed words are taken out sequentially from the head and an appearance bit is set in bits for appearance positions in a bitmap corresponding to each of the taken-out words. In the encoding processing, the taken-out words are then encoded into static codes corresponding to the words using the static dictionary S0.

For example, FIG. 2 illustrates " . . . in front of the . . . " as the text data F1 being an encoding target. In the text data F1, "in" appears at the 100th position. Further, "front" appears at the 101st position in the text data F1, "of" appears at the 102nd position in the text data F1, and "the" appears at the 103rd position in the text data F1.

In the encoding processing, lexical analysis is performed on this text data F1. In this example, "in", "front", "of", "the", . . . are results of the lexical analysis.

In the encoding processing, with respect to the word "in" appearing at the 100th position as an example, an appearance bit "1" is written in a bit for an appearance position "100" in a bitmap corresponding to the word "in". In the encoding processing, the word "in" is then encoded into a static code "27" corresponding to the word "in" using the static dictionary S0 and is written in encoded data.

In the encoding processing, with respect to the word "front" appearing at the 101st position as an example, an appearance bit "1" is written in a bit for an appearance position "101" in a bitmap corresponding to the word "front". In the encoding processing, the word "front" is then encoded into a static code "aa" corresponding to the word "front" using the static dictionary S0 and is written in the encoded data.

In the encoding processing, with respect to the word "of" appearing at the 102nd position as an example, an appearance bit "1" is written in a bit for an appearance position "102" in a bitmap corresponding to the word "of". In the encoding processing, the word "of" is then encoded into a static code "23" corresponding to the word "of" using the static dictionary S0 and is written in the encoded data.

In this way, the encoding processing can speed up encoding of English words by performing encoding in units of English words. Furthermore, the encoding processing can speed up encoding of CJK characters by performing encoding in units of CJK characters similarly to the words. That is, when the text data F1 is Japanese, the encoding processing takes a long time if the text data F1 is morphologically analyzed and encoded. However, the encoding processing can speed up encoding by performing encoding in units of CJK characters without performing morphological analysis. The morphological analysis in this case is breaking into character strings which are minimal units having a meaning. This encoding processing can be applied also to text data in which English parts and Japanese parts are mixed, such as explanatory sentences in an English-Japanese dictionary.

Search Processing According to Embodiment

Figure 3:
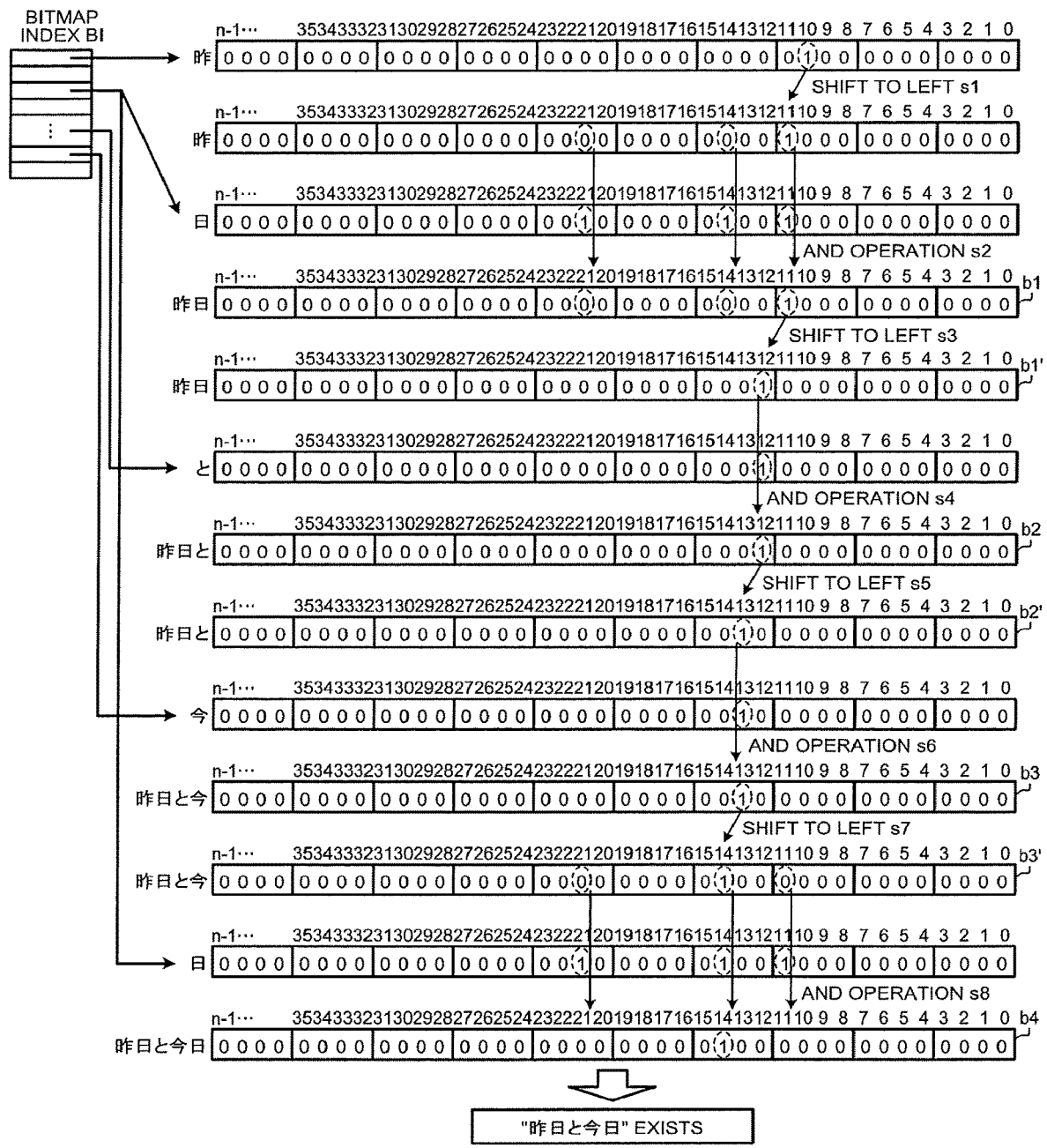
FIG. 3 is a diagram illustrating an example of a flow of search processing according to the embodiment.

FIG. 3 is a diagram illustrating an example of a flow of search processing according to the embodiment. As illustrated in FIG. 3, in the search processing, a logical operation between a bitmap included in the bitmap index BI and a search bitmap generated to be associated with the appearance order of respective characters constituting a character string as a search condition is performed to search for the character string as the search condition. It is assumed that the character string as the search condition is synonymous with "search character string". In the following descriptions of the search processing, the bitmap index BI illustrated in FIG. 1 is referred to.

As illustrated in FIG. 3, in the search processing performed by the information processing device, a search character string is received. In this example, the search character string is "昨日と今日".

In the search processing, whether there is the search character string is determined referring to the bitmap index BI.

For example, in the search processing, a bitmap corresponding to a leading character included in the search character string is extracted from the bitmap index BI and the extracted bitmap is shifted to left by one bit (s1). In this example, a bitmap corresponding to a leading character "昨" included in the search character string "昨日と今日" is extracted from the bitmap index BI in the search processing. In this bitmap, "1" is set in the 10th bit. In the search processing, this bitmap is shifted to left by one bit. In the resultant bitmap, "1" is set in the 11th bit.

In the search processing, a bitmap corresponding to a subsequent character included in the search character string is extracted from the bitmap index BI and an AND operation between the extracted bitmap and the bitmap corresponding to the leading character and obtained by the shifting is performed (s2). In this example, in the search processing, a bitmap corresponding to a subsequent second character "日" included in the search character string "昨日と今日" is extracted from the bitmap index BI. In this bitmap, "1" is set in the 11th, 14th, and 21st bits. In the search processing, an AND operation between the bitmap corresponding to the leading character "昨" and obtained by the shifting and a bitmap corresponding to a subsequent character "日" is performed. A bitmap b1 obtained by the AND operation corresponds to a search bitmap generated to be associated with the appearance order in "昨日" constituting the search character string. In the search processing, whether all bits in the bitmap b1 are "0" as a result of the operation is determined. Because the 11th bit in the bitmap b1 is calculated as "1", it is determined that not all the bits are "0". That is, in the search processing, it is determined that there is a character string "昨日" including the character of this time and the subsequent character.

In the search processing, because the search character string includes unprocessed characters, the bitmap obtained by this AND operation is shifted to left by one bit (s3). In this example, in the search processing, the bitmap b1 indicating the operation result corresponding to the character string "昨日" is shifted to left by one bit to generate a bitmap b1'. In this bitmap, "1" is set in the 12th bit.

In the search processing, a bitmap corresponding to a subsequent character included in the search character string is extracted from the bitmap index BI and an AND operation between the extracted bitmap and the bitmap corresponding to the leading character string and obtained by the shifting is performed (s4). In this example, in the search processing, a bitmap corresponding to the subsequent third character "と" included in the search character string "昨日と今日" is extracted from the bitmap index BI. In this bitmap, "1" is set in the 12th bit. In the search processing, an AND operation between the bitmap b1' corresponding to the leading character string "昨日" and obtained by the shifting and the bitmap corresponding to the subsequent character "と" is performed. A bitmap b2 as a result of this AND operation corresponds to a search bitmap generated to be associated with the appearance order in "昨日と" constituting the search character string. In the search processing, whether all bits in the bitmap b2 are "0" as a result of the operation is determined. In this example, because the 12th bit in the bitmap b2 is calculated as "1", it is determined that not all the bits are "0". That is, in the search processing, it is determined that there is a character string "昨日と" including the character string of this time and the next character.

In the search processing, because the search character string includes unprocessed characters, the bitmap obtained by this AND operation is shifted to left by one bit (s5). In this example, in the search processing, the bitmap b2 indicating the operation result corresponding to the character string "昨日と" is shifted to left by one bit to generate a bitmap b2'. In this bitmap, "1" is set in the 13th bit.

In the search processing, a bitmap corresponding to a subsequent character included in the search character string is extracted from the bitmap index BI and an AND operation between the extracted bitmap and the bitmap corresponding to the leading character string and obtained by the shifting is performed (s6). In this example, a bitmap corresponding to the subsequent fourth character "今" included in the search character string "昨日と今日" is extracted from the bitmap index BI in the search processing. In this bitmap, "1" is set in the 13th bit. In the search processing, an AND operation between the bitmap b2' corresponding to the leading character string "昨日と" and being a result of the shifting and the bitmap corresponding to the subsequent character "今" is performed. A bitmap b3 obtained by this AND operation corresponds to a search bitmap generated to be associated with the appearance order in "昨日と今" constituting the search character string. In the search processing, whether all bits in the bitmap b3 are "0" as a result of the operation is determined. Because the 13th bit in the bitmap b3 is calculated as "1" in this example, it is determined that not all the bits are "0". That is, in the search processing, it is determined that there is a character string "昨日と今" including the character string of this time and the next character.

In the search processing, because the search character string includes unprocessed characters, the bitmap obtained by this AND operation is shifted to left by one bit (s7). In this example, the bitmap b3 indicating the operation result corresponding to the character string "昨日と今" is shifted to left by one bit to generate a bitmap b3' in the search processing. In this bitmap, "1" is set in the 14th bit.

In the search processing, a bitmap corresponding to a subsequent character included in the search character string is extracted from the bitmap index BI and an AND operation between the extracted bitmap and the bitmap corresponding to the leading character string and being a result of the shifting is performed (s8). In this example, a bitmap corresponding to the subsequent fifth character "日" included in the search character string "昨日と今日" is extracted from the bitmap index BI in the search processing. In this bitmap, "1" is set in the 11th, 14th, and 21st bits. In the search processing, an AND operation between the bitmap b3' corresponding to the leading character string "昨日と今" and obtained by the shifting and the bitmap corresponding to the subsequent character "日" is performed. A bitmap b4 as a result of this AND operation corresponds to a search bitmap generated to be associated with the appearance order in "昨日と今日" constituting the search character string. In the search processing, whether all bits in the bitmap b4 are "0" as a result of the operation is determined. In this example, because the 14th bit in the bitmap is calculated as "1", it is determined that not all the bits are "0". That is, in the search processing, it is determined that there is a character string "昨日と今日" including the character string of this time and the next character.

In the search processing, because the search character string includes no unprocessed character, whether there is the search character string is determined. In this example, because there is the search character string "昨日と今日", the presence of the search character string "昨日と今日" is output as a search result in the search processing.

In this way, the search processing can speed up searching by performing full-text searching using the bitmap index BI without performing substantive matching. Furthermore, the search processing can speed up searching by performing full-text searching using the bitmap index BI while considering continuity of the positions of respective characters constituting a search character string. The search processing has been described assuming that the search condition is a character string. However, identical effects can be obtained also when the search condition is a word string. Furthermore, the search processing can provide identical effects also when the search condition is a word string in which characters and words are mixed. For example, in the search processing, it suffices to break a word string as the search condition into characters and words based on a mixture rule of characters and words and perform full-text searching using the bitmap index BI. For example, the mixture rule of characters and words includes a mixture rule in which words are separated by terminal symbols (a space, for example) even when characters and words are mixed.

Configuration Example of Encoded File

Figure 4:
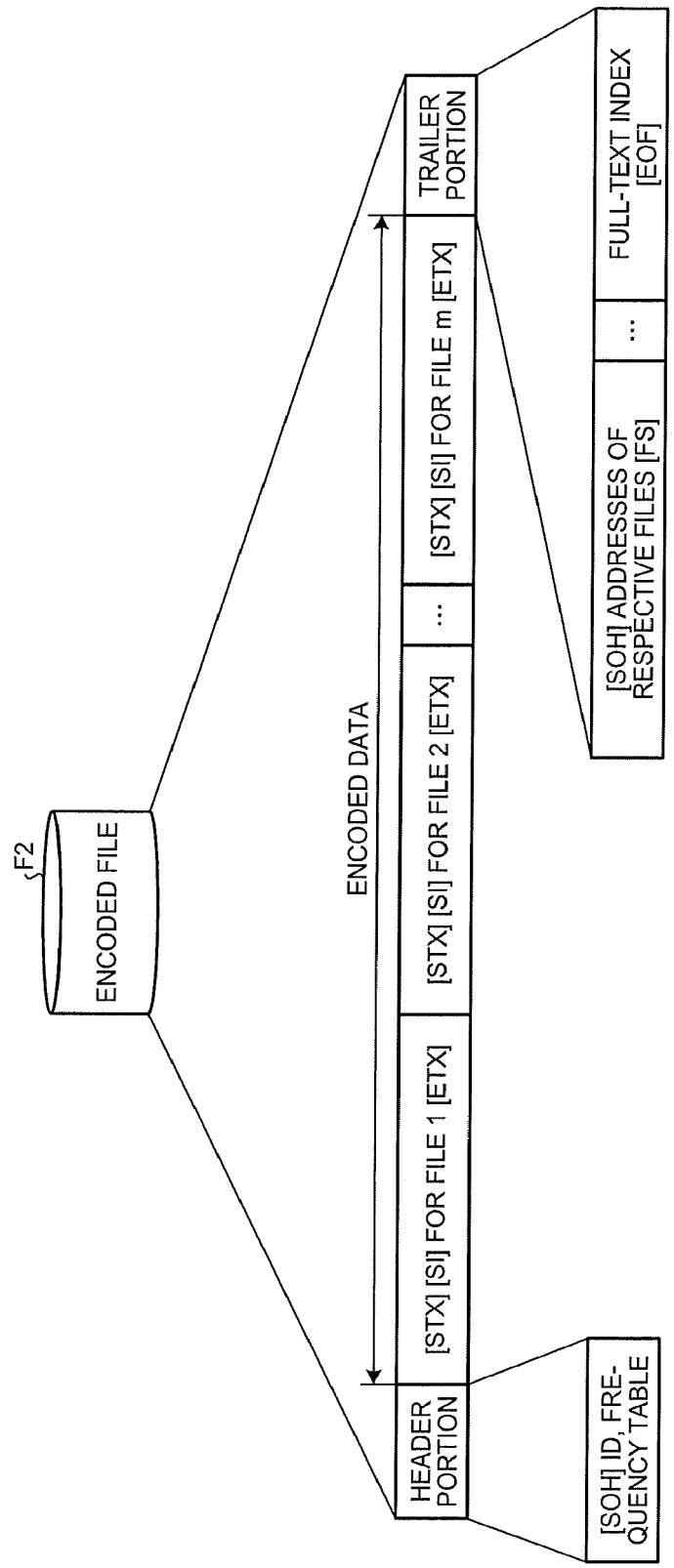
FIG. 4 is a diagram illustrating a configuration example of an encoded file according to the embodiment.

FIG. 4 is a diagram illustrating a configuration example of an encoded file according to the embodiment. As illustrated in FIG. 4, an encoded file F2 has a header portion, encoded data, and a trailer portion. The encoded data stores therein a group of encoded codes obtained by encoding of the text data F1. When the text data F1 includes a plurality of files, the encoded data includes, for example, encoded data of the respective files such as encoded data for a file 1 and encoded data for a file 2. The trailer portion stores therein addresses of the respective files, a full-text index, and the like. The full-text index corresponds to the bitmap indexes BI illustrated in FIGS. 1 and 2. When the text data F1 includes a plurality of files, the addresses of the respective files indicate addresses in the encoded data corresponding to the files. As an example, the address of each file is a relative address from the head of the encoded data. The header portion stores therein, for example, information to identify an encoding algorithm used to generate the encoded file F2 or information such as a parameter used for encoding, and pointers for respective pieces of the information stored in the trailer portion is stored therein, for example.

Configuration of Information Processing Device According to Embodiment

Figure 5:
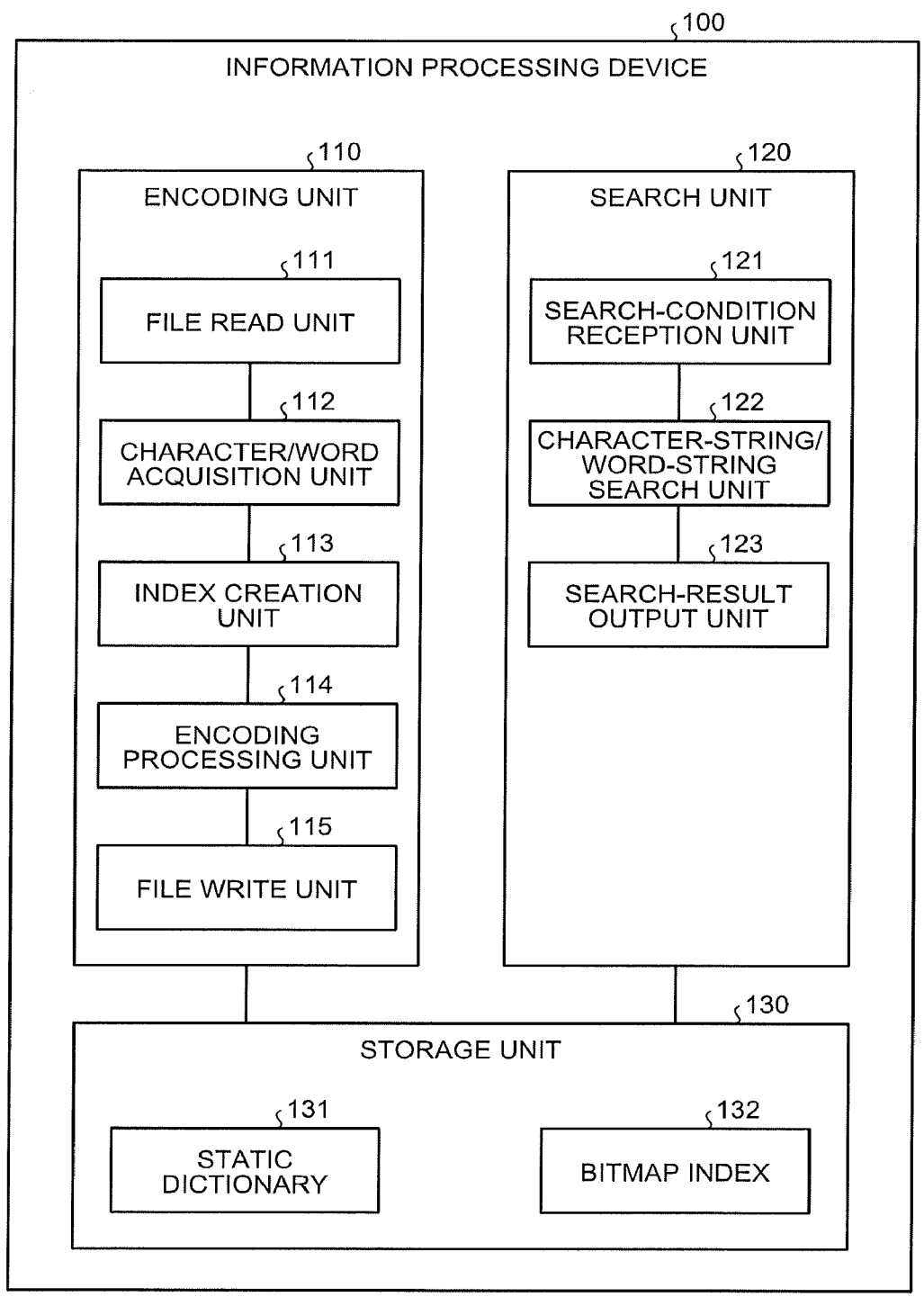
FIG. 5 is a functional block diagram illustrating an example of a configuration of an information processing device according to the embodiment.

FIG. 5 is a functional block diagram illustrating an example of a configuration of the information processing device according to the embodiment. As illustrated in FIG. 5, an information processing device 100 has an encoding unit 110, a search unit 120, and a storage unit 130.

The encoding unit 110 is a processing unit that performs the encoding processing illustrated in FIGS. 1 and 2. The encoding unit 110 has a file read unit 111, a character/word acquisition unit 112, an index creation unit 113, an encoding processing unit 114, and a file write unit 115.

The search unit 120 is a processing unit that performs the search processing illustrated in FIG. 3. The search unit 120 has a search-condition reception unit 121, a character-string/word-string search unit 122, and a search-result output unit 123.

The storage unit 130 corresponds to a storage device such as a non-volatile semiconductor memory element, for example, a flash memory or an FRAM® (Ferroelectric Random Access Memory). The storage unit 130 has a static dictionary 131 and a bitmap index 132.

The static dictionary 131 is a dictionary in which the appearance frequencies of characters or words appearing in a document are specified based on a general English dictionary, Japanese dictionary, or textbook and shorter codes are assigned to characters or words having higher appearance frequencies. Static codes being codes corresponding to respective characters or words are previously registered in the static dictionary 131. The static dictionary 131 corresponds to the static dictionary S0.

The bitmap index 132 is a set of bitmaps in which the presence or absence of words or characters included in the text data F1 with respect to each offset (appearance position) are indexed. The bitmap index 132 corresponds to the bitmap index BI. Because descriptions of the bitmap index 132 are identical to those of FIGS. 1 and 2, the descriptions thereof are omitted.

The file read unit 111 reads the text data F1 being an encoding target into the storage area.

The character/word acquisition unit 112 acquires characters or words from the text data F1. For example, the character/word acquisition unit 112 performs a lexical analysis on the text data F1 that has been read into the storage area. The character/word acquisition unit 112 sequentially acquires characters or words as a result of the lexical analysis from the head of the text data F1. The character/word acquisition unit 112 associates the acquired characters or word with the respective appearance positions in the text data F1 to be output to the index creation unit 113. The character/word acquisition unit 112 outputs the acquired characters or words to the encoding processing unit 114.

The index creation unit 113 creates the bitmap index 132. For example, the index creation unit 113 extracts a bitmap corresponding to each of the characters output from the character/word acquisition unit 112 from the bitmap index 132. The index creation unit 113 sets appearance bits corresponding to appearance positions within the text data F1 in the extracted bitmap. The index creation unit 113 extracts a bitmap corresponding to each of the words output from the character/word acquisition unit 112 from the bitmap index 132. The index creation unit 113 sets appearance bits corresponding to appearance positions within the text data F1 in the extracted bitmap.

The encoding processing unit 114 encodes characters or words. For example, the encoding processing unit 114 encodes the characters output from the character/word acquisition unit 112 into static codes registered in the static dictionary 131. The encoding processing unit 114 encodes the words output from the character/word acquisition unit 112 into static codes registered in the static dictionary 131.

The file write unit 115 stores the encoded codes obtained by the encoding processing unit 114 in units of files in the encoded data of the encoded file F2. The file write unit 115 writes the bitmap index 132 in the trailer portion of the encoded file F2. The file write unit 115 writes the addresses of respective files in the encoded data in the trailer portion of the encoded file F2.

The search-condition reception unit 121 receives a search condition. For example, the search-condition reception unit 121 receives a character string being a search target or a word string being a search target as the search condition. The search-condition reception unit 121 can receive a word string in which characters and words are mixed as the search condition.

When the search condition is a character string being a search target, the character-string/word-string search unit 122 refers to the bitmap index 132 and determines whether there is the character string being the search target in the text data F1. When the search condition is a word string being a search target, the character-string/word-string search unit 122 refers to the bitmap index 132 and determines whether there is the word string being the search target in the text data F1. When the search condition is a word string in which characters and words are mixed, the character-string/word-string search unit 122 refers to the bitmap index 132 and determines whether there is the word string being the search target in the text data F1.

For example, the character-string/word-string search unit 122 performs following processing when the search condition is a character string being the search target. The character-string/word-string search unit 122 extracts a bitmap corresponding to each of characters included in the character string being the search target from the bitmap index 132. The character-string/word-string search unit 122 shifts the bitmap corresponding to a leading character included in the character string being the search target to left by one bit. The character-string/word-string search unit 122 performs an AND operation between a bitmap corresponding to the leading character and obtained by the shifting and a bitmap corresponding to a subsequent character included in the character string being the search target. A bitmap being a result of this AND operation is a search bitmap generated to be associated with the appearance order in the leading character and the subsequent character consecutive in the character string being the search target. The character-string/word-string search unit 122 determines whether all bits are "0" as a result of the operation. The character-string/word-string search unit 122 determines that there is a character string including the leading character and the subsequent character when not all the bits are "0". When the character string being the search target includes unprocessed characters, the character-string/word-string search unit 122 further repeats the search processing of a character string including the character string currently processed and a subsequent character. The character-string/word-string search unit 122 ends the operation processing when the character string being the search target includes no unprocessed character, and determines that there is the character string being the search target when not all the bits are "0" as a result of the operation. That is, the character-string/word-string search unit 122 determines that there is the character string being the search target. The character-string/word-string search unit 122 determines that there is not a character string including the leading character (or character string) and the subsequent character when all the bits are "0" as a result of the operation. That is, the character-string/word-string search unit 122 determines that there is not a character string being the search target.

The search-result output unit 123 outputs a search result. For example, when the character-string/word-string search unit 122 determines that there is the search target, the search-result output unit 123 outputs the presence of the search target as the search result. When the character-string/word-string search unit 122 determines that there is not a search target, the search-result output unit 123 outputs the absence of the search target as the search result.

Process Procedure of Encoding Processing According to Embodiment

Figure 6:
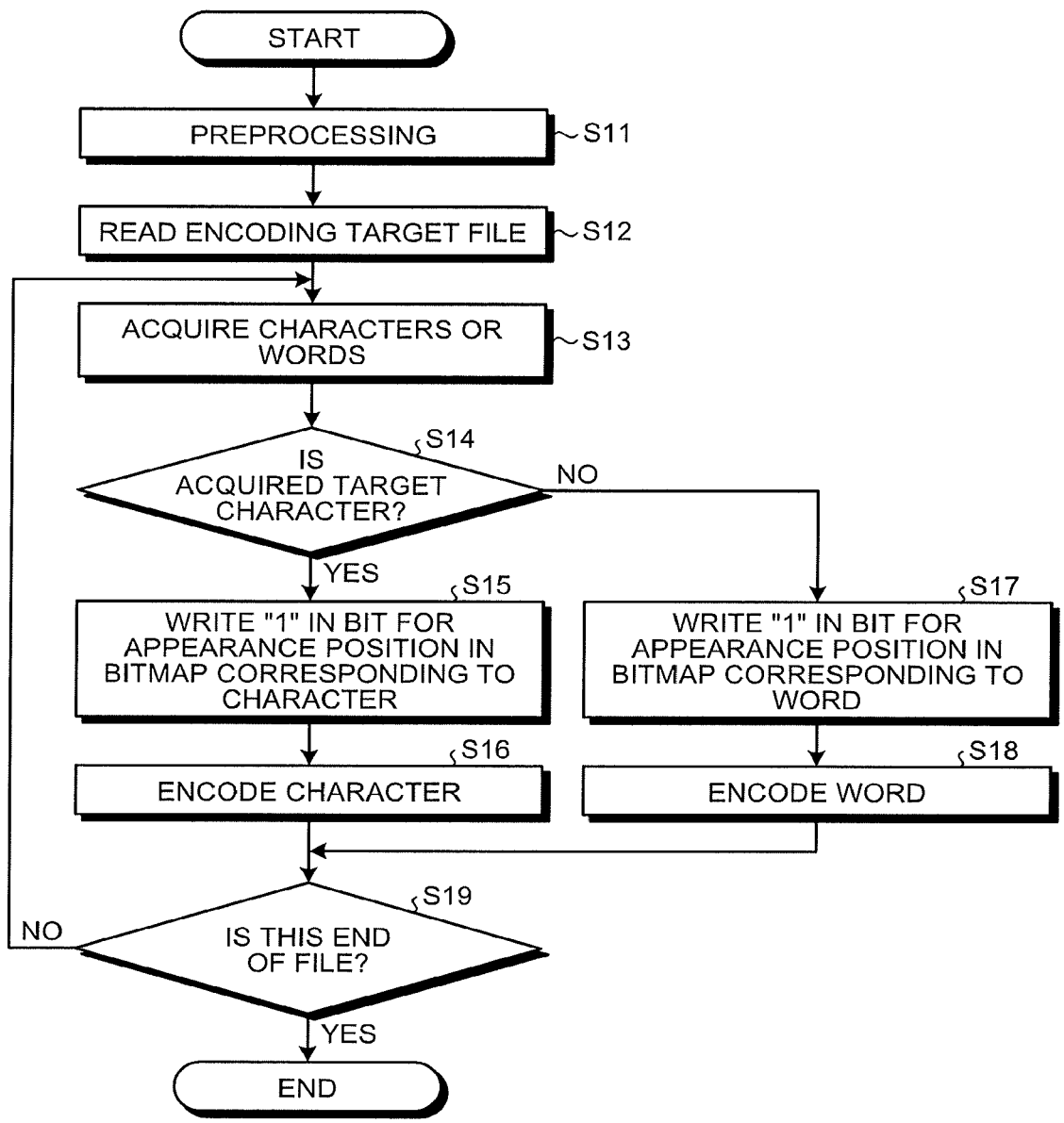
FIG. 6 is a diagram illustrating an example of a flowchart of the encoding processing according to the embodiment.

A process procedure performed by the encoding unit 110 illustrated in FIG. 5 is described with reference to FIG. 6. FIG. 6 is a diagram illustrating an example of a flowchart of the encoding processing according to the embodiment.

As illustrated in FIG. 6, the encoding unit 110 performs preprocessing (Step S11). For example, the encoding unit 110 secures various storage areas in the storage unit 130. The encoding unit 110 then reads an encoding target file and stores the text data F1 in a storage area for reading (Step S12).

The encoding unit 110 acquires characters or words from the storage area for reading (Step S13). For example, the encoding unit 110 lexically analyzes the text data F1 stored in the storage area for reading and acquires characters or words as a result of the lexical analysis sequentially from the head of the text data F1.

The encoding unit 110 determines whether an acquired target is a character (Step S14). When determining that the acquired target is a character (YES at Step S14), the encoding unit 110 writes "1" in a bit for the appearance position in a bitmap corresponding to the acquired character (Step S15). For example, the encoding unit 110 extracts a bitmap corresponding to the acquired character from the bitmap index 132. The encoding unit 110 sets an appearance bit corresponding to the appearance position in the text data F1 of the acquired character in the extracted bitmap.

The encoding unit 110 encodes the acquired character into a static code registered in the static dictionary 131 (Step S16). The encoding unit 110 then proceeds to Step S19.

On the other hand, when determining that the acquired target is not a character (NO at Step S14), the encoding unit 110 determines that the acquired target is a word and writes "1" in a bit for the appearance position in a bitmap corresponding to the word (Step S17). For example, the encoding unit 110 extracts a bitmap corresponding to the acquired word from the bitmap index 132. The encoding unit 110 sets an appearance bit corresponding to the appearance position in the text data F1 of the acquired word in the extracted bitmap.

The encoding unit 110 encodes the acquired word into a static code registered in the static dictionary 131 (Step S18). The encoding unit 110 then proceeds to Step S19.

At Step S19, the encoding unit 110 determines whether this is the end of the file (Step S19). When determining that this is not the end of the file (NO at Step S19), the encoding unit 110 proceeds to Step S13 to acquire a next character or word.

On the other hand, when determining that this is the end of the file (YES at Step S19), the encoding unit 110 ends the encoding processing.

Process Procedure of Search Processing According to Embodiment

Figure 7:
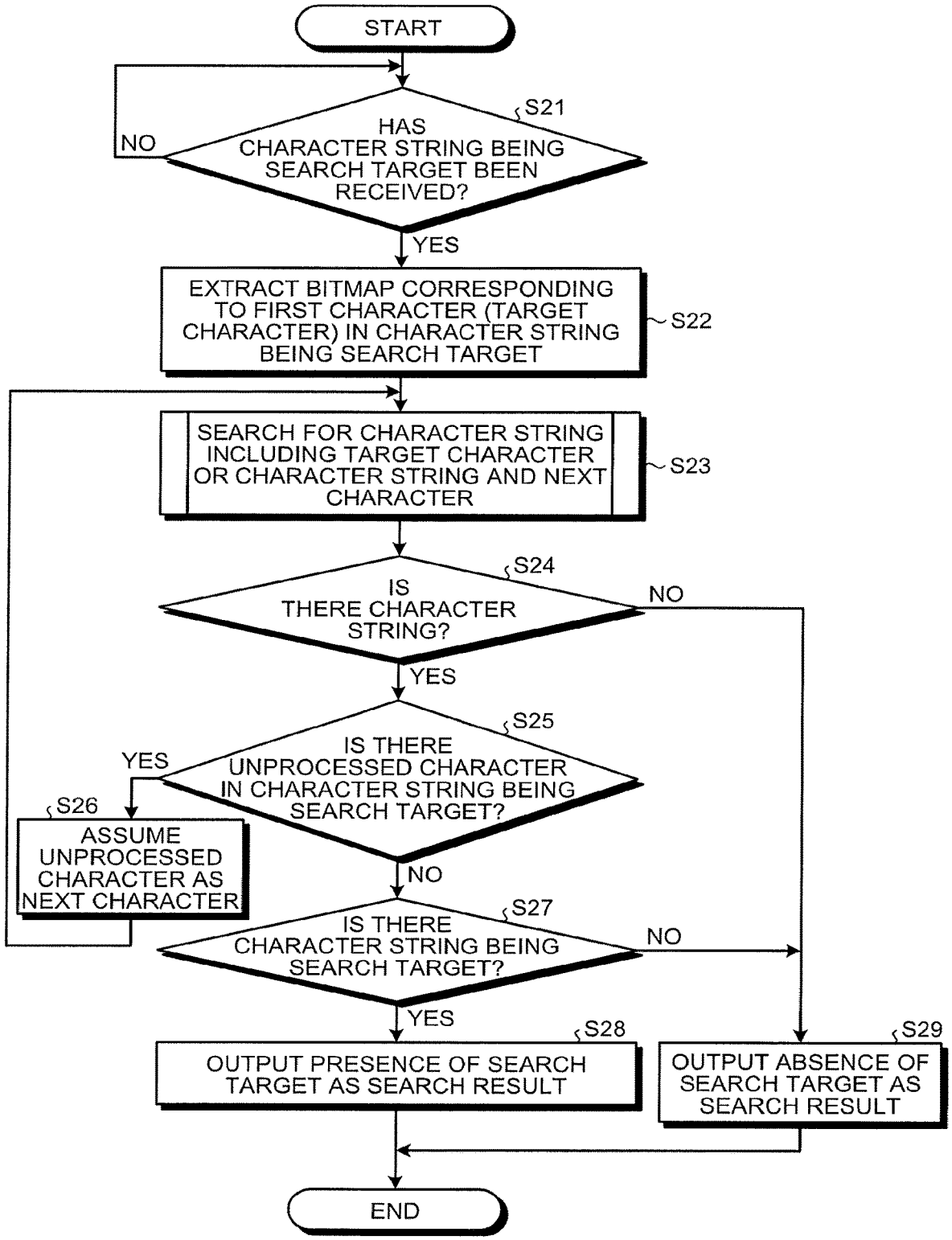
FIG. 7 is a diagram illustrating an example of a flowchart of the search processing according to the embodiment.

A process procedure performed by the search unit 120 illustrated in FIG. 5 is described with reference to FIG. 7. FIG. 7 is a diagram illustrating an example of a flowchart of the search processing according to the embodiment. A case where the search condition is a character string is described as an example of the process procedure performed by the search unit 120.

As illustrated in FIG. 7, the search unit 120 determines whether a character string being the search target has been received (Step S21). When determining that a character string being the search target has not been received (NO at Step S21), the search unit 120 repeats the determining process until a character string being the search target is received.

On the other hand, when determining that a character string being the search target has been received (YES at Step S21), the search unit 120 assumes a first character in the character string being the search target as a target character and extracts a bitmap corresponding to the target character from the bitmap index 132 (Step S22).

The search unit 120 preforms search processing for a character string including the target character or character string and the next character (Step S23). A flowchart of the search processing for a character string will be described later.

As a result of the search processing for a character string, the search unit 120 determines whether there is the character string (Step S24). When determining that there is not a character string (NO at Step S24), the search unit 120 proceeds to Step S29.

On the other hand, when determining that there is the character string (YES at Step S24), the search unit 120 determines whether there is an unprocessed character in the character string being the search target (Step S25). When determining that there is an unprocessed character in the character string being the search target (YES at Step S25), the search unit 120 assumes the unprocessed character as the next character (Step S26). The search unit 120 then proceeds to Step S23 to search for a character string including the next character.

On the other hand, when determining that there is no unprocessed character in the character string being the search target (NO at Step S25), the search unit 120 determines whether there is the character string being the search target (Step S27). When determining that there is the character string being the search target (YES at Step S27), the search unit 120 outputs the presence of the search target as a search result (Step S28). The search unit 120 then ends the search processing.

On the other hand, when determining that there is not a character string being the search target (NO at Step S27), the search unit 120 proceeds to Step S29. At Step S29, the search unit 120 outputs the absence of the search target as a search result (Step S29). The search unit 120 then ends the search processing.

Flowchart of Character-String Search Processing According to Embodiment

Figure 8:
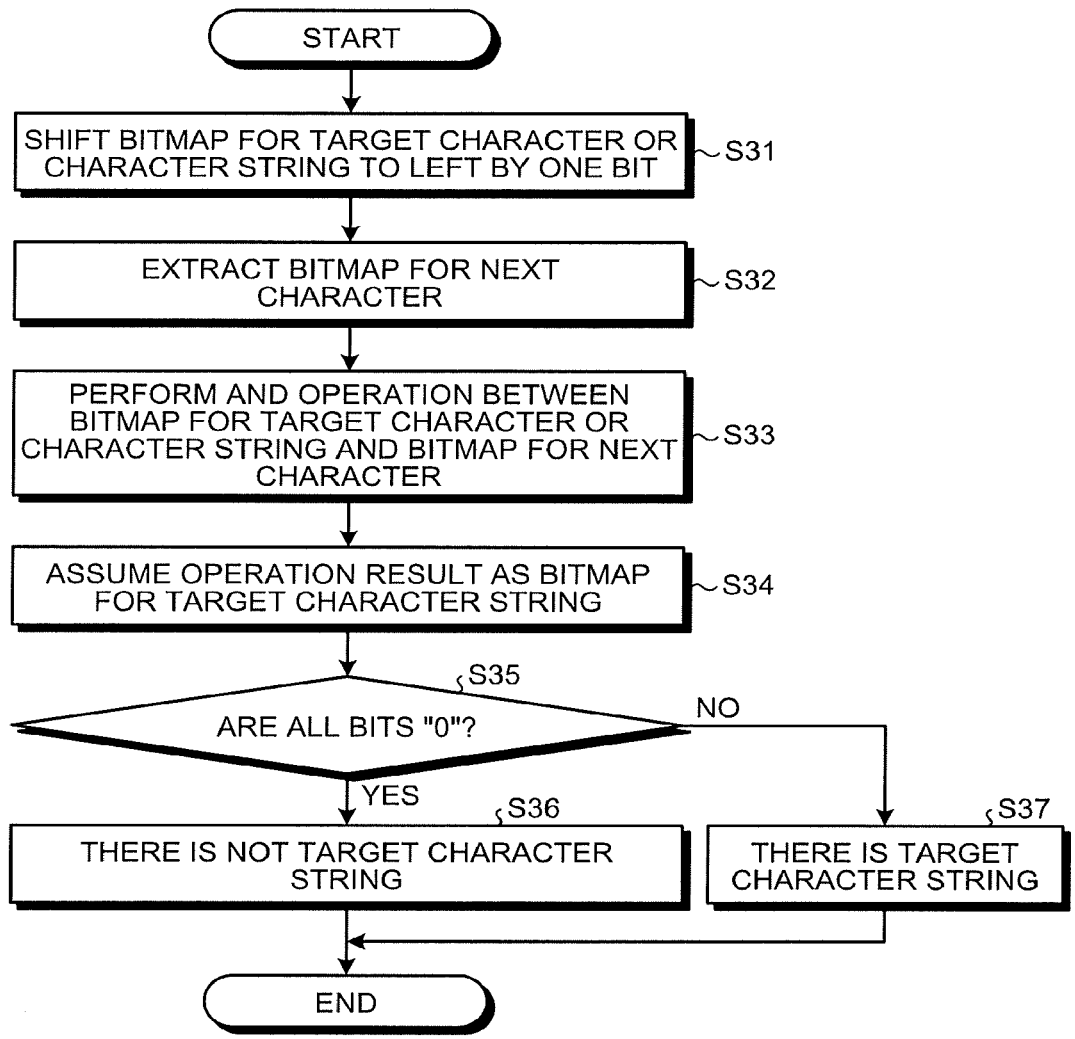
FIG. 8 is a diagram illustrating an example of a flowchart of character-string search processing according to the embodiment.

FIG. 8 is a diagram illustrating an example of a flowchart of character-string search processing according to the embodiment.

As illustrated in FIG. 8, the search unit 120 shifts a bitmap for a target character or character string to left by one bit (Step S31). The search unit 120 then extracts a bitmap for the next character from the bitmap index 132 (Step S32). The search unit 120 performs an AND operation between the bitmap for the target character or character string and the bitmap for the next character (Step S33). The search unit 120 then assumes a bitmap indicating a result of the AND operation as a bitmap for a target character string including the next character added to the target character or character string (Step S34). That is, the bitmap indicating the result of the AND operation corresponds to a search bitmap generated to be associated with the appearance order of respective characters constituting the character string being the search target.

The search unit 120 determines whether all bits in the bitmap indicating the result of the AND operation are "0" (Step S35). When determining that all the bits are "0" (YES at Step S35), the search unit 120 determines that there is not a target character string in the text data F1 (Step S36). The search unit 120 then ends the character-string search processing.

On the other hand, when it is determined that not all the bits are "0" (NO at Step S35), the search unit 120 determines that there is the target character string in the text data F1 (Step S37). The search unit 120 then ends the character-string search processing.

In this way, the information processing device 100 receives a search character string for the target text data F1. The information processing device 100 searches for the search character string by a logical operation between the bitmap index 132 and search bitmap data generated to be associated with the appearance order in the search character string of respective characters or words constituting the search character string. The bitmap index 132 is information that associates appearance positions in target text data F1 of respective characters or words appearing in the target text data F1 as bitmap data. With this configuration, the information processing device 100 can perform searching at a high speed and with less search noise by a logical operation between bitmap data for each of characters or words in the bitmap index 132 and bitmap data corresponding to characters or words constituting the search character string. Furthermore, the information processing device 100 can speed up the search by performing the search while considering continuity of the positions of the characters or words constituting the search character string.

When characters and words are mixed in the received search character string, the information processing device 100 breaks the search character string based on the mixture rule of characters and words. The information processing device 100 searches for the search character string by a logical operation between the bitmap index 132 and bitmap data corresponding to each of the broken characters and words. Due to this configuration, the information processing device 100 can perform searching at a high speed and with less search noise even when characters and words are mixed in the search character string.

The information processing device 100 receives the text data F1 as a target. The information processing device 100 creates the bitmap index 132 with respect to each of characters or words appearing in the target text data F1 and encodes the text data F1 in units of characters or in units of words. Upon receipt of a search character string for the encoded text data F1, the information processing device 100 searches for the search character string using the created bitmap index 132. With this configuration, the information processing device 100 can search for the search character string by searching for the search character string using the bitmap index 132 without decoding the encoded text data F1, so that the search character string can be retrieved at a high speed. Furthermore, the information processing device 100 can speed up the encoding by performing encoding in units of characters, instead of character strings which are minimal units having a meaning.

Furthermore, the information processing device 100 shifts bitmap data of a first character constituting the search character string, which is associated with the bitmap index 132, to left. The information processing device 100 performs an AND operation between bitmap data indicating a result of the left shifting and bitmap data of a second character following the first character constituting the search character string, which is associated with the bitmap index 132. When appearance positions of the consecutive first and second characters are set in search bitmap data indicating a result of the AND operation and being generated to be associated with the appearance order in the consecutive first and second characters, the information processing device 100 shifts the search bitmap data to left. The information processing device 100 performs an AND operation between search bitmap data indicating a result of the left shifting and bitmap data of a third character following the second character constituting the search character string, thereby searching for the search character string. Due to this configuration, the information processing device 100 can search for a search character string at a high speed by generating search bitmap data for consecutive characters constituting the search character string and performing an AND operation between the generated search bitmap data and bitmap data of a further consecutive character, which is associated with the bitmap index 132.

Other Modes Related to Embodiment

A part of a modification of the above embodiment is described below. Other than the modification described below, design changes can be appropriately made within a range not departing from the scope of the present invention.

In the embodiment, it is described that the encoding unit 110 stores the bitmap index 132 created by the index creation unit 113 in the trailer portion of the encoded file F2. However, the encoding unit 110 can store a hashed index obtained by hashing the bitmap index 132 with respect to each bitmap, instead of the bitmap index 132, in the trailer portion of the encoded file F2. In this case, the search unit 120 extracts a hashed bitmap corresponding to each of characters included in a character string being a search target from the hashed index stored in the trailer portion of the encoded file F2, and restores the extracted hashed index. It suffices that the search unit 120 searches for the character string being the search target by the searching method of the character-string/word-string search unit 122 using the restored bitmap. That is, it suffices that the search unit 120 realizes full-text searching by bitmap shifting and AND operations. In this way, even when the number of available resources is small, the information processing device 100 can encode the text file F1 with the small number of resources to index the text file F1 and perform high-speed searching by using the indexed information.

Information including process procedures, control procedures, specific names, various types of data and parameters described in the embodiment can be arbitrary changed unless otherwise specified.

Hardware Configuration of Information Processing Device

Figure 9:
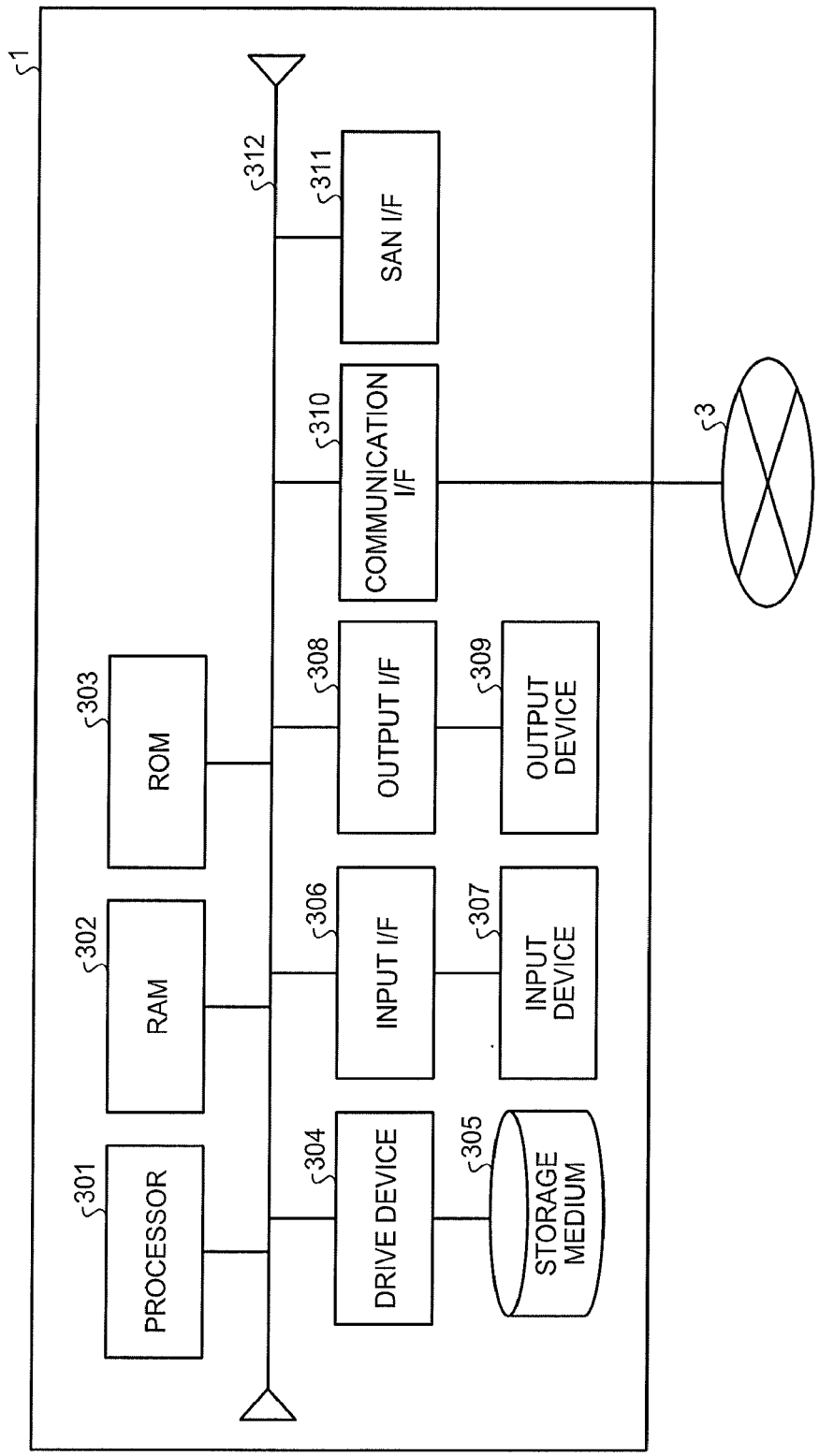
FIG. 9 is a diagram illustrating a hardware configuration example of a computer.

Hardware and software used in the embodiment described above are described below. FIG. 9 is a diagram illustrating a hardware configuration example of a computer. A computer 1 includes, for example, a processor 301, a RAM (Random Access Memory) 302, a ROM (Read Only Memory) 303, a drive device 304, a storage medium 305, an input interface (I/F) 306, an input device 307, an output interface (I/F) 308, an output device 309, a communication interface (I/F) 310, a SAN (Storage Area Network) interface (I/F) 311, and a bus 312. The respective pieces of hardware are connected via the bus 312.

The RAM 302 is a memory device in/from which data can be written/read and a semiconductor memory, such as an SRAM (Static RAM) or a DRAM (Dynamic RAM), or a flash memory instead of the RAM is used. The ROM 303 includes also a PROM (Programmable ROM) and the like. The drive device 304 is a device that performs at least either read or write of information stored in the storage medium 305. The storage medium 305 stores therein information written by the drive device 304. The storage medium 305 is, for example, a hard disk, a flash memory such as an SSD (Solid State Drive), or a storage medium such as a CD (Compact Disc), a DVD (Digital Versatile Disc), or a Blu-ray disc. For example, in the computer 1, the drive device 304 and the storage medium 305 are provided for each of plural types of storage media.

The input interface 306 is a circuit that is connected to the input device 307 and that transmits an input signal received from the input device 307 to the processor 301. The output interface 308 is a circuit that is connected to the output device 309 and that causes the output device 309 to perform an output according to an instruction of the processor 301. The communication interface 310 is a circuit that executes control of communication via a network 3. The communication interface 310 is, for example, a network interface card (NIC). The SAN interface 311 is a circuit that executes control of communication with a storage device connected to the computer 1 via a storage area network. The SAN interface 311 is, for example, a host bus adapter (HBA).

The input device 307 is a device that transmits an input signal according to an operation. The input device 307 is, for example, a key device such as a button attached to a keyboard or the body of the computer 1, or a pointing device such as a mouse or a touch panel. The output device 309 is a device that outputs information in response to control of the computer 1. The output device 309 is, for example, an image output device (display device) such as a display, or an audio output device such as a speaker. For example, an input/output device such as a touch screen is used as the input device 307 and the output device 309. The input device 307 and the output device 309 can be integrated with the computer 1 or can be a device that is not included in the computer 1 and, for example, connected externally to the computer 1.

For example, the processor 301 reads a program stored in the ROM 303 or the storage medium 305 into the RAM 302 and performs the processing of the encoding unit 110 and the processing of the search unit 120 in accordance with a procedure of the read program. At that time, the RAM 302 is used as a work area of the processor 301. The function of the storage unit 130 is realized by storage of a program file (an application program 24, middleware 23, and an OS 22, which will be described later) or a data file (such as the static dictionary 131 and the bitmap index 132) in the ROM 303 and the storage medium 305 and use of the RAM 302 as a work area of the processor 301. The program read by the processor 301 is described with reference to FIG. 10.

Figure 10:
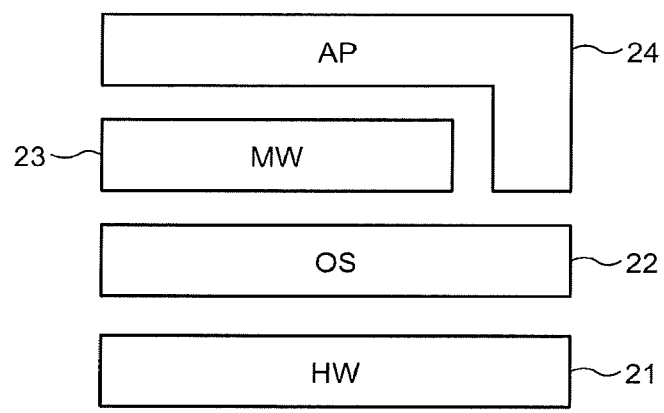
FIG. 10 is a diagram illustrating a configuration example of a program running on the computer.

FIG. 10 is a diagram illustrating a configuration example of a program running on a computer. The OS (Operating System) 22 that executes control of a hardware group (HW) 21 (301 to 312) illustrated in FIG. 10 runs on the computer 1. The processor 301 operates in a procedure according to the OS 22 to execute control and management of the hardware group (HW) 21, so that processes according to the application program (AP) 24 or the middleware (MW) 23 are performed in the hardware group (HW) 21. In the computer 1, the middleware (MW) 23 or the application program (AP) 24 is read in the RAM 302 and executed by the processor 301.

When an encoding function is called, the processor 301 performs processes based on at least a part of the middleware 23 or the application program 24, so that the function of the encoding unit 110 is realized (by performing those processes by controlling the hardware group 21 based on the OS 22). When a search function is called, the processor 301 performs processes based on at least a part of the middleware 23 or the application program 24, so that the function of the search unit 120 is realized (by performing those processes by controlling the hardware group 21 based on the OS 22). The encoding function and the search function can be contained in the application program 24 itself or can be a part of the middleware 23 that is executed by being called according to the application program 24.

Figure 11:
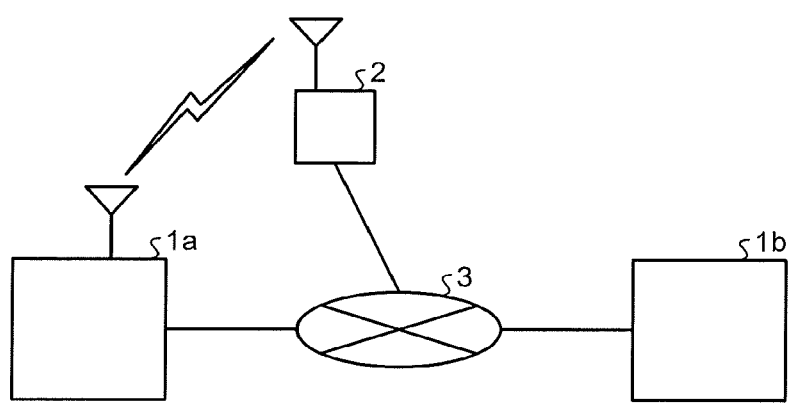
FIG. 11 is a diagram illustrating a configuration example of devices in a system according to the embodiment.

FIG. 11 illustrates a configuration example of devices in a system according to the embodiment. The system illustrated in FIG. 11 includes a computer 1a, a computer 1b, a base station 2, and the network 3. The computer 1a is connected to the network 3 that is connected to the computer 1b either in a wired or wireless manner.

The encoding unit 110 and the search unit 120 of the information processing device 100 illustrated in FIG. 5 can be included in either the computer 1a or the computer 1b illustrated in FIG. 11. The computer 1b can include the function of the encoding unit 110 and the computer 1a can include the function of the search unit 120. Alternatively, the computer 1a can include the function of the encoding unit 110 and the computer 1b can include the function of the search unit 120. The computer 1a and the computer 1b both can include the function of the encoding unit 110 and the function of the search unit 120.

According to one aspect, character strings indicated by a search condition can be retrieved from document data at a high speed.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a data search program that causes a computer to execute a process comprising:
   receiving a search character string for target text data; and
   searching for the search character string by a logical operation between index information associated with appearance positions in the target text data of each of characters or words appearing in the target text data as bitmap data and search bitmap data generated to be associated with an appearance order in the search character string of respective characters or respective words constituting the search character string, wherein
   the searching includes performing full-text searching using a bitmap index (BI) while considering continuity of the positions of the respective characters or the respective words, without performing substantive matching,
   the receiving includes receiving the target text data,
   the process further includes generating the index information with respect to each of characters or words appearing in the target text data and encoding the text data in units of the characters or in units of the words,
   the receiving includes receiving a search character string for the encoded target text data, and
   the searching includes searching for the search character string by a logical operation between the generated index information and search bitmap data generated to be associated with an appearance order in the search character string of respective characters or respective words constituting the search character string, wherein
   the searching includes searching for the search character string by searching for the search character string using the bitmap index without decoding the encoded target text data.

2. The non-transitory computer-readable recording medium according to claim 1, wherein
   the process further includes breaking the search character string based on a predetermined mixture rule of characters and words when characters and words are mixed in the received search character string, and
   the searching includes searching for the search character string by a logical operation between the index information and search bitmap data generated to be associated with an appearance order in the search character string of the respective broken characters and words.

3. The non-transitory computer-readable recording medium according to claim 1, wherein
the searching includes
shifting bitmap data of a first character constituting the search character string, the bitmap data being associated with the index information, to left and performing an AND operation between bitmap data indicating a result of left shifting and bitmap data of a second character following the first character constituting the search character string, the bitmap data being associated with the index information, and
searching for the search character string by shifting the search bitmap data generated to be associated with an appearance order in the consecutive first and second characters, the search bitmap data indicating a result of an AND operation, to left and performing an AND operation between the search bitmap data indicating a result of left shifting and bitmap data of a third character following the second character constituting the search character string, when appearance positions of the consecutive first and second characters are set in the search bitmap data.

4. A data search device comprising:
a processor configured to:
receive a search character string for target text data; and
search for the search character string by a logical operation between index information associated with appearances positions in the target text data of each of characters or words appearing in the target text data as bitmap data and search bitmap data generated to be associated with an appearance order in the search character string of respective characters or respective words constituting the search character string received at the receiving, wherein
the searching includes performing full-text searching using a bitmap index (BI) while considering continuity of the positions of the respective characters or the respective words, without performing substantive matching,
the receiving includes receiving the target text data,
the process further includes generating the index information with respect to each of characters or words appearing in the target text data and encoding the text data in units of the characters or in units of the words,
the receiving includes receiving a search character string for the encoded target text data, and
the searching includes searching for the search character string by a logical operation between the generated index information and search bitmap data generated to be associated with an appearance order in the search character string of respective characters or respective words constituting the search character string, wherein
the searching includes searching for the search character string by searching for the search character string using the bitmap index without decoding the encoded target text data.

5. A data search method comprising:
receiving a search character string for target text data, by a processor; and
searching for the search character string by a logical operation between index information associated with appearance positions in the target text data of each of characters or words appearing in the target text data as bitmap data and search bitmap data generated to be associated with an appearance order in the search character string of respective characters or respective words constituting the search character string, by the processor, wherein
the searching includes performing full-text searching using a bitmap index (BI) while considering continuity of the positions of the respective characters or the respective words, without performing substantive matching,
the receiving includes receiving the target text data,
the process further includes generating the index information with respect to each of characters or words appearing in the target text data and encoding the text data in units of the characters or in units of the words,
the receiving includes receiving a search character string for the encoded target text data, and
the searching includes searching for the search character string by a logical operation between the generated index information and search bitmap data generated to be associated with an appearance order in the search character string of respective characters or respective words constituting the search character string, wherein
the searching includes searching for the search character string by searching for the search character string using the bitmap index without decoding the encoded target text data.

* * * * *